(12) United States Patent
Masputra et al.

(10) Patent No.: US 7,257,633 B2
(45) Date of Patent: Aug. 14, 2007

(54) DYNAMIC ALLOCATION OF A POOL OF THREADS

(75) Inventors: Cahya Adi Masputra, Millbrae, CA (US); Kacheong Poon, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 858 days.

(21) Appl. No.: 10/379,184

(22) Filed: Mar. 3, 2003

(65) Prior Publication Data

US 2004/0177165 A1 Sep. 9, 2004

(51) Int. Cl.
*G06F 15/173* (2006.01)
(52) U.S. Cl. .............. 709/226; 709/225; 709/227; 709/250; 709/230
(58) Field of Classification Search .............. 709/250, 709/230, 225–227
See application file for complete search history.

(56) References Cited

U.S. PATENT DOCUMENTS

| | | | | |
|---|---|---|---|---|
| 5,619,650 A | * | 4/1997 | Bach et al. ............... | 709/230 |
| 5,991,792 A | * | 11/1999 | Nageswaran ............. | 718/102 |
| 6,047,323 A | * | 4/2000 | Krause .................... | 709/227 |
| 6,418,458 B1 | * | 7/2002 | Maresco ................... | 718/103 |
| 6,493,740 B1 | * | 12/2002 | Lomax ..................... | 718/107 |
| 6,633,914 B1 | * | 10/2003 | Bayeh et al. ............. | 709/227 |
| 6,665,682 B1 | * | 12/2003 | DeKimpe et al. ......... | 707/101 |
| 6,687,729 B1 | * | 2/2004 | Sievert et al. ............ | 718/102 |
| 6,898,617 B2 | * | 5/2005 | Doolittle et al. .......... | 709/201 |
| 2005/0108710 A1 | * | 5/2005 | Patiejunas ................ | 718/100 |

* cited by examiner

*Primary Examiner*—Philip B. Tran
(74) *Attorney, Agent, or Firm*—Martine Penilla & Gencarella, LLP

(57) ABSTRACT

Embodiments of the present invention provide for execution of a protocol in a multi-processor network device. In one embodiment, a hash function is applied to one or more fields of the data packet header to determine a unique index. A hash table is then queried, whereby data indicating one or more threads corresponding to said unique index is extracted. An available thread of execution, which has previously handled packet in the same receive stream, may thus be selected from a pool of threads. The selected thread of execution is then dispatched to provide for receive processing of the present data packet.

19 Claims, 8 Drawing Sheets

| HEADER 410 | PAYLOAD 415 |

FIGURE 4A

| 425 INDEX | 430 THREADS | |
|---|---|---|
| 0 | T0 | T1 |
| 1 | T2 | T3 |
| 3 | T4 | T5 |

420 { rows above }

FIGURE 4B

| 445 INDEX | 450 THREADS | | |
|---|---|---|---|
| 0 | T0 | T1 | T2 |
| 1 | T3 | T4 | T5 |
| 3 | T6 | T7 | T8 |
| 4 | T9 | T10 | T11 |

440 { rows above }

FIGURE 4C

DYNAMIC ALLOCATION OF A POOL OF THREADS

FIELD OF THE INVENTION

Embodiments of the present invention relate to a multi-processor communication network device, and more particularly to dynamic allocation of threads of execution for receive processing of data packets.

BACKGROUND OF THE INVENTION

Referring to FIG. 1, a diagram of a network device, in accordance with the conventional art, is shown. As depicted in FIG. 1, the network device 110 (e.g. computer, workstation, server, or the like) comprises one or more interface modules 120, one or more protocol stacks 130, and one or more applications 140. The interface module 120 provides for receipt of data packets 150 transmitted on a communication channel 160. The protocol stack 130 provides for processing of the data packets 150 destined for the application 140. The application 140 (e.g., database systems, text editors, games, and the like) provides users with various functions.

Each data packet 150 is comprised of a header 170 and a payload 180. The interface module 120 acquires each data packet 150 and stores it in a buffer. The interface module 120 generates an interrupt upon acquiring a data packet 150. An operating system of the network device 110 catches the interrupt and spins off a thread of execution to handle the interrupt. The thread of execution provides for execution of the protocol stack 130. The interrupt therefore causes the protocol stack 130 to receive the data packet and provide for routing and flow control. The thread of execution then delivers the payload 180 of the data packet 150 to the destination application 140 in accordance with the processing of the header 170.

The protocol stack 130 provides a network communication protocol, such as the transmission control protocol/internet protocol (TCP/IP) suite, or the like. Such network communication protocols typically provide a flow control layer. The flow control layer keeps track of data packets to assure reliable delivery to an intended destination application. It includes explicit and acknowledged connection initiation and termination, reliable in-order unduplicated delivery of data, and out of band indication of urgent data. The network communication protocol also typically provides an addressing and routing layer. The addressing and routing layer includes host-to-host addressing and routing of data packets, data packet fragmentation, and re-assembly. The network communication protocol also typically provides a network layer. The network layer provides access to and transmission of data across the communication channel 160.

The one or more applications and each instance of the protocol stack may be provided for by a plurality of processors. Each processor may be utilized to provide for receipt of any given packet. However, data locality of information and instructions utilized for receive processing is not maintained when any given packet may be processed by any given processor. As a result, a high degree of cache trashing occurs. Alternatively, the receive processing may be provided for by a given processor. However, dedicated processing of data packets by a given processor may cause one processor to suffer from a high degree of utilization, while other processors are idle.

Thus, there is a continued need for a network communication method providing for efficient processor utilization and reduced cache trashing in a multi-processor network device. The method should also be capable of providing for increased network throughput.

SUMMARY OF THE INVENTION

Embodiments of the present invention provide for improved load balancing in a multiprocessor network device. Embodiments of the present invention provide for pooling threads of execution. Embodiments of the present invention also provide for selectively dispatching threads of execution.

Embodiments of the present invention form a pool of threads. Pooling the threads of execution provides for increased data packet processing bandwidth. The number of threads comprising the pool of threads may be based upon a particular configuration of the network device, such as the number of processors, the number of network interface cards, and/or the like. In one embodiment, the pool of threads is comprises of two threads of execution for each processor in the network device.

Embodiments of the present invention provide for selectively dispatching a given thread of execution from the pool of threads. Selective dispatching a thread of execution from the pool of threads improves data locality. In one embodiment, a hash function is applied to one or more fields of the present data packet header to determine a unique index. A hash table is then queried, whereby data indicating one or more threads corresponding to said unique index is extracted. An available thread of execution, which has handled previous data packets in the same receive stream, may thus be selected from a pool of threads. The selected thread of execution is then dispatched to provide for receive processing of the present data packet.

Accordingly, embodiments of the present invention advantageously provide for efficient processor utilization and increase network throughput. The increased number of threads provides for processing more packets. In addition, receive processing of data packets may be dynamically processed by a plurality of processors, thereby balancing the processor utilization in a multi-processor network device. Furthermore, embodiments of the present invention also advantageously maintain data locality. A given thread of execution is dispatched from the pool such that a processor which previously provided for receipt of data packets in the same receive stream will process to current packet in such receive stream. Thus, cache trashing is reduced, which results in reduced bus traffic and reduced processor utilization.

Embodiments of the present invention provide for reliable receipt of data packets by a network device. Embodiments of the present invention also provide a flexible and protocol-independent method for receiving data packets. Embodiments of the present invention require minimal and localized changes to the protocol stack. Accordingly, embodiments of the present invention avoid fundamental changes to processing data packets, and minimize potential impact on network device stability and performance.

BRIEF DESCRIPTION OF THE DRAWINGS

The present invention is illustrated by way of example and not by way of limitation, in the figures of the accompanying drawings and in which like reference numerals refer to similar elements and in which:

FIG. 4A shows a block diagram of an exemplary data packet for implementing embodiments of the present invention.

FIG. 4B shows a block diagram of an exemplary hash table in accordance with one embodiment of the present invention.

FIG. 4C shows a block diagram of an exemplary hash table in accordance with another embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
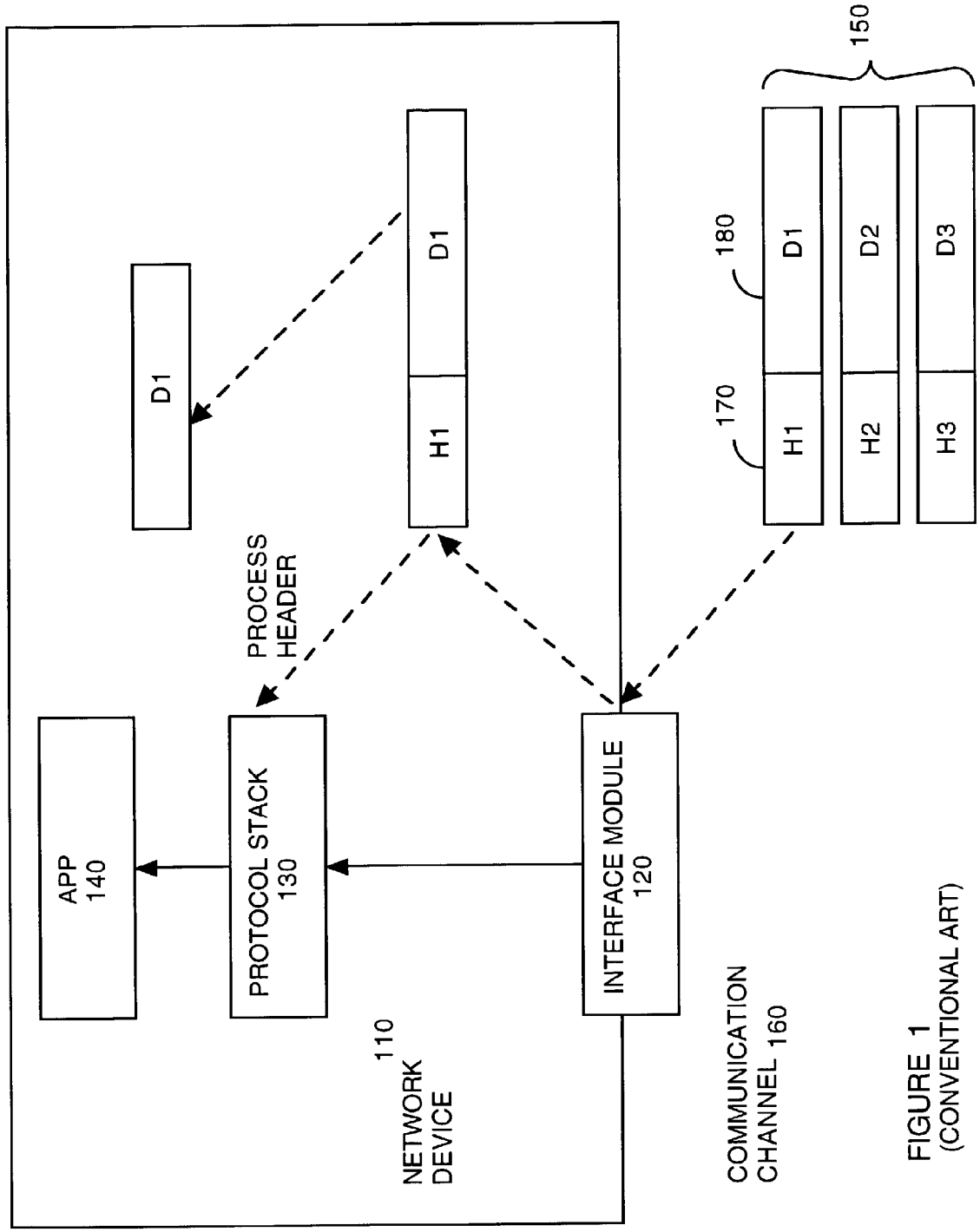
FIG. 1 shows a diagram of a network device, in accordance with the conventional art.
Figure 2:
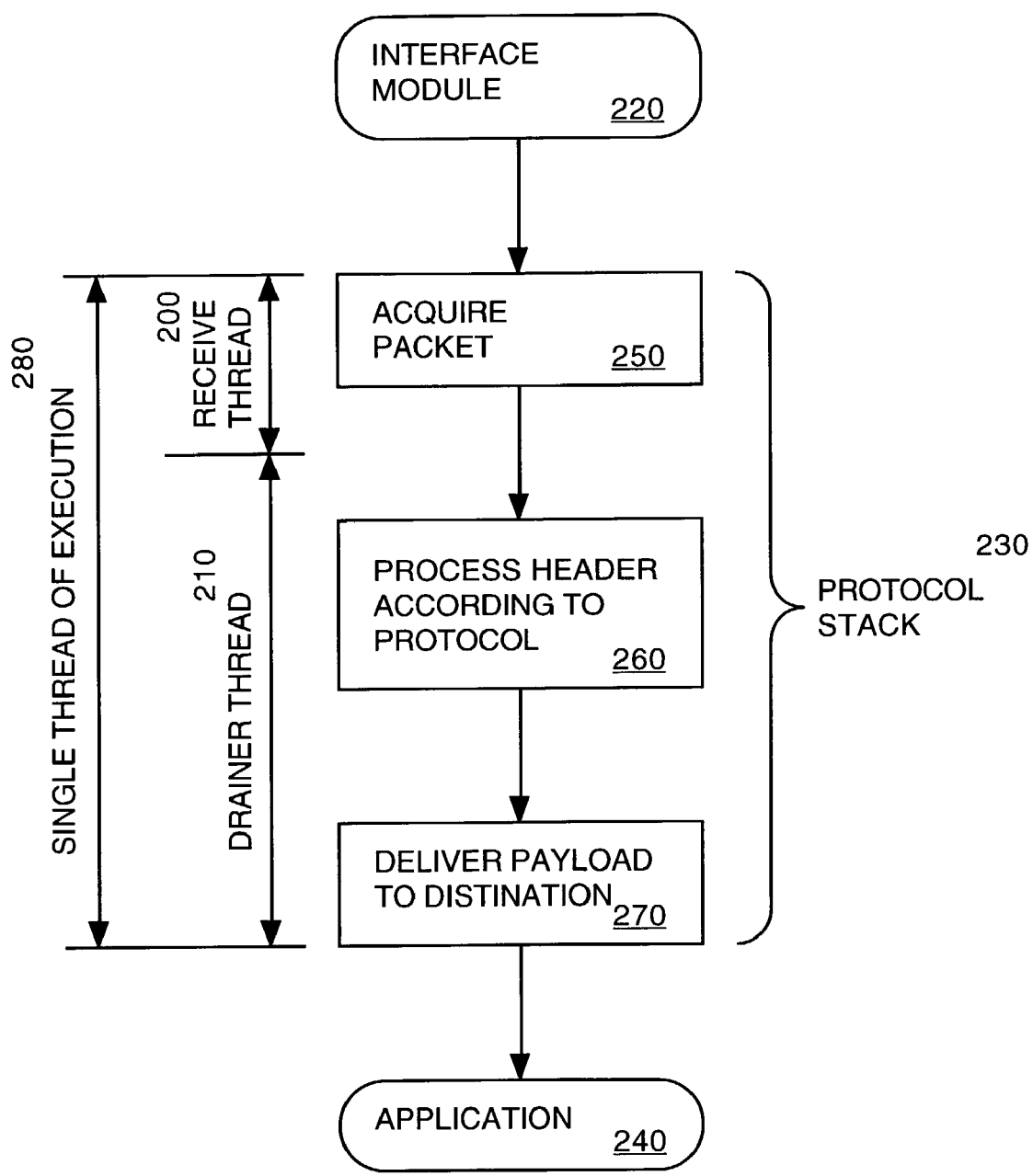
FIG. 2 shows a flow diagram of a computer implemented receive process in accordance with one embodiment of the present invention.

Referring now to FIG. 2, a flow diagram of a computer implemented receive process in accordance with Inventors' co-pending United States Patent Application entitled "Data Communication Execution Thread" is shown. To the extent not repeated herein, the contents of "Data Communication Execution Thread" (Ser. No. 10/254,174, filed Sep. 24, 2002, inventors Poon et. al.), assigned to the assignee of the present invention, is incorporated herein by reference. As depicted in FIG. 2, the process begins with acquisition of a data packet by an interface module, at step 250. The header of the data packet is then processed in accordance with an applicable protocol, at step 260. The payload of each data packet is then copied to the destination application, at step 270.

In one embodiment, the process of receiving packets 250, processing the data packet header according to the applicable protocol 260, and delivering the data packet payload to the destination application are provided for by a single thread of execution In another embodiment, the process of receiving packets 250 is provided for by a receive thread 200 of execution. Processing the data packet header according to the applicable protocol 260, and copying the data packet payload to the destination application 270 are provided for by a drainer thread 210 of execution. The multiple threads result in increase data latency because of the handing-off between the receive thread 200 and the drainer thread 210. However, the process for receiving packets 250 can be executed again, while the drainer thread 210 is handling the current data packet. Therefore, increased throughput can be obtained by trading increased data latency for faster receive processing of incoming data packets.

In yet another embodiment, a single thread of execution or a receive and drainer threads of execution may be dynamically allocated. Dynamic allocation of threads of execution may be performed in accordance with Inventor's co-filed United States Patent Application entitled "Load-Balancing Utilizing one or More Threads of Execution for Implementing a Protocol Stack." To the extent not repeated herein, the contents of "Load-Balancing Utilizing one or More Threads of Execution for Implementing a Protocol Stack" (Ser. No. 10/378,764, inventors Poon et al.), assigned to the assignee of the present invention, is incorporated herein by reference. Accordingly, the protocol stack may be executed as a single thread of execution when the network device is in a first state. Alternatively, the protocol stack may be executed as a receive thread of execution and a drainer thread of execution when the network device is in a second state. The state of the network device may be determined by one or more conditions. The conditions may comprise a system load, a trend of the system load, a data packet traffic type, a trend of the traffic type, and/or the like.

In a multi-processor network device, each processor and/or network interface module may provide a single thread of execution, and/or a receive thread and drainer thread. Thus, in one embodiment of the present invention, the single thread of executions, and/or the receive threads and drainer threads may be pooled. Pooling the single threads of execution, and/or receive threads and drainer threads provides for selectively dispatching the threads to handle receipt of the data packet.

Furthermore, the performance of the network device may be increased by creating additional single threads of execution and/or receive threads and drainer threads. The number of single threads of execution, and/or receive threads and drainer threads, in a respective pool may be based upon the hardware configuration (e.g., processors, interface modules, and the like) and/or the system load (e.g., number of connections and the like). In one implementation a dynamic pool allocator creates a plurality of single threads of execution, and/or receive threads and drainer threads, based upon the greater of the number of processors or interface modules.

In one implementation, the single threads of execution, and/or receive threads and drainer threads, are dispatched round robin from the pool to provide for receipt of the next data packet. Thus, receipt of a data packet may be provided by any one of the processors. However, the particular receive stream that handled the previous packet destined for a particular application, may have been handled by a single thread of execution, and/or drainer thread and receive thread, associated with a different processor. As a result, connection locality is not maintained.

In another implementation, the single threads of execution, and/or receive threads and drainer threads, are selectively dispatched from the pool. Thus, receipt of a data packet may be provided by the same processor, which previously provided for receipt of a data packet originating from the same source and/or bound for the same destination. As a result, data locality may be maintained.

Figure 3:
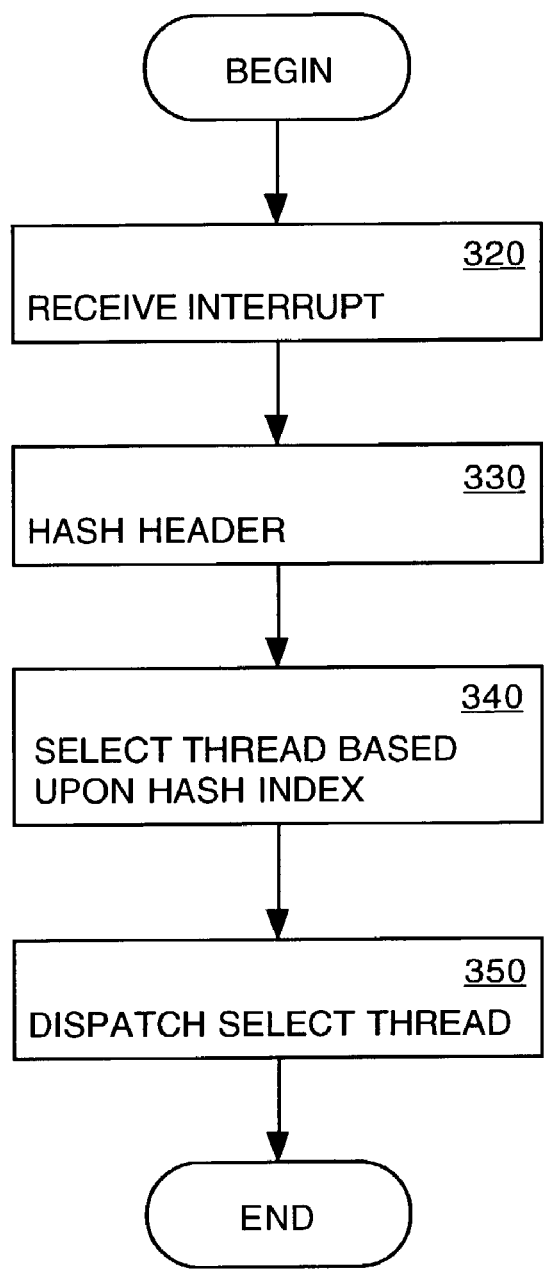
FIG. 3 shows a block diagram of a dynamic pool allocator in accordance with one embodiment of the present invention.

Referring now to FIG. 3, a flow diagram of a process performed by a dynamic pool allocator, in accordance with one embodiment of the present invention, is shown. As depicted in FIG. 3, the dynamic pool allocator receives an interrupt, at step 320, indicating the receipt of a data packet. The dynamic pool allocator hashes the header, at step 330, of the data packet to determine a unique index. The unique index is utilized by the dynamic pool allocator to select a particular single thread of execution, or receive and drainer thread, at step 340. The dynamic pool allocator then dispatches the selected single thread of execution, or received and drainer thread, at step 350, to provide for receive processing of the data packet.

If the unique index does not currently exist in the table, the dynamic pool allocator may allocate a particular single thread of execution, and/or receive and drainer threads to the unique index. In one implementation, the unique index is associated with a single thread of execution, and/or receive and drainer thread, based upon a round robin assignment. In another implementation, the unique index is associated with a single thread of execution, and/or receive and drainer thread, based upon the current utilization level of the processors. The dynamic allocator then creates a record in the hash table, which associates the unique index to the particular single thread of execution, and/or receive and drainer thread.

The dynamic pool allocator may also determine the number of threads that the pool comprises. In one implementation, the dynamic pool allocator provides a pool of single threads of execution, and/or receive and drainer threads, in proportion to the greater of the number of processors or the number of interface modules.

Referring now to FIG. 4A, a block diagram of an exemplary data packet for implementing embodiments of the present invention is shown. As depicted in FIG. 4A, the data packet comprises a header 410 and a payload 415. The header 410 typically comprises one or more fields indicating a source address, a destination address, a source port, a destination port, packet sequence identifier, error detecting and/or correcting code, and/or the like.

In one implementation, the one or more fields of the header 410 are applied to a hash function to calculate an index. For example, the source address, the destination address, the source port, and/or the destination port are applied to the hash function to calculate a unique index. The unique index is substantially smaller than the header itself, and therefore facilitates correlation of the header to one or more particular threads of execution.

The hash function may be a division-remainder hash, a folding hash, radix transformation hash, digital rearrangement hash, or the like. In one implementation, the hash function comprises a folding hash function. The folding hash function separates the header 410 into several parts. The several parts are then added together. The index is then obtained by using some arbitrary number of bits of the sum of the several parts of the header 410.

Referring now to FIG. 4B, a block diagram of an exemplary hash table in accordance with one embodiment of the present invention is shown. As depicted in FIG. 4B, the table comprises a plurality of records 420. Each record 420 comprises an index 425 and one or more corresponding thread identifiers 430.

In one implementation, two threads are created for each processor in a network device. Each thread 430 for a given processor is then associated with a given index 425. Upon receipt of a data packet, the header is hashed to obtain a unique index 425. For example, the portion of the header comprising the destination address and destination port are hashed to obtain a hash value of '1'. Based upon the index, the hash table is queried to selectively dispatch an appropriate thread. The hash table indicates that threads T2 or T2 may be utilized to provide for execution of the protocol stack. Each packet having a header with the same destination address and port will therefore provide the same hash index. Thus, either thread T2 or T3 may be dispatched. As a result, connection locality is maintained for packets with headers containing the same destination address and destination port.

Referring now to FIG. 4C, a block diagram of an exemplary hash table in accordance with another embodiment of the present invention is shown. As depicted in FIG. 4C, the table comprises a plurality of records 440. Each record comprises an index 445 and three corresponding thread identifiers 450. The hash table is illustrative of an implementation wherein three threads are created for each processor, network module, or the like in a network device.

Figure 5:
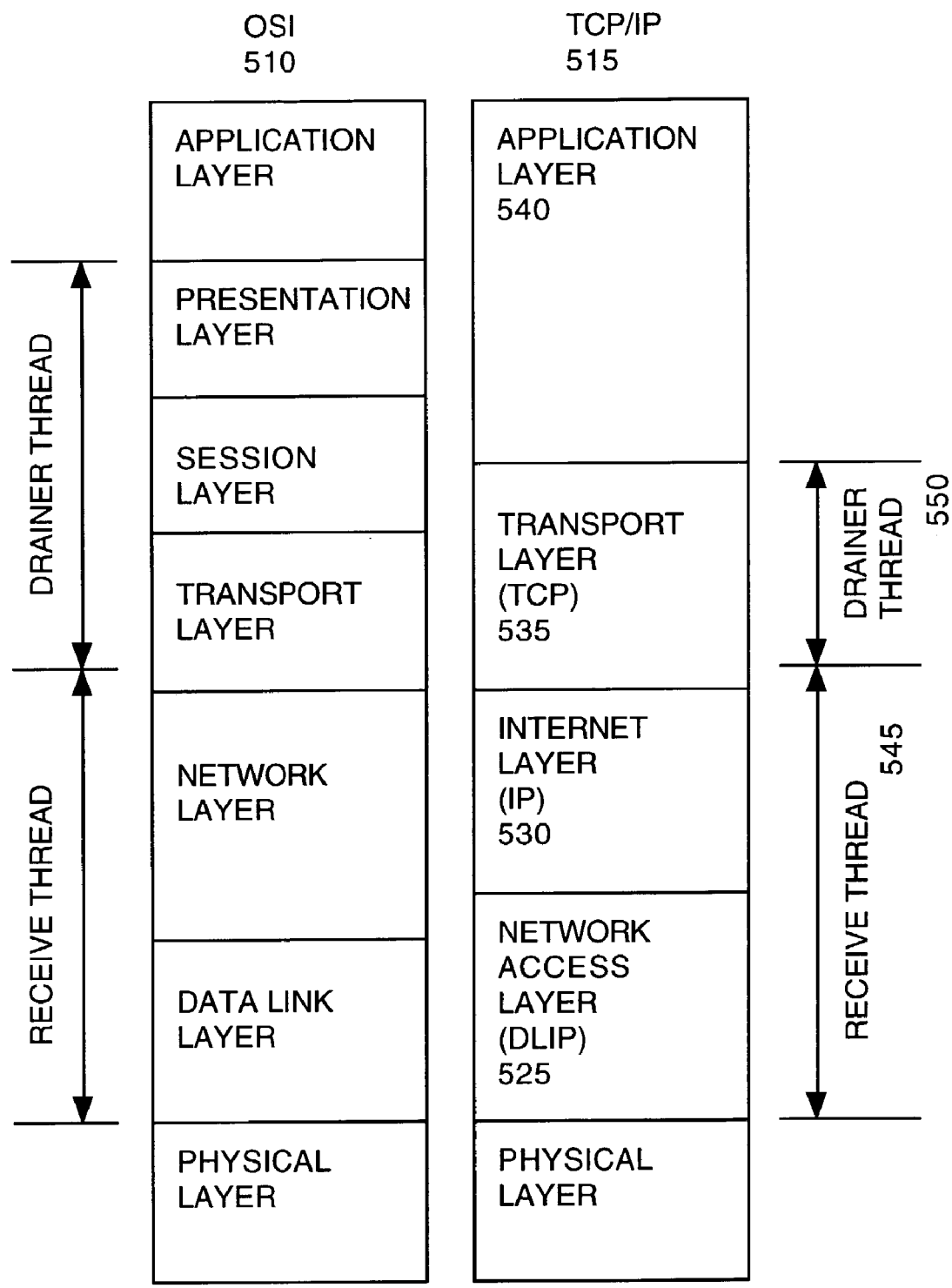
FIG. 5 shows a block diagram of various protocol architectures, for implementing embodiments of the present invention.

Referring now to FIG. 5, a block diagram of various protocol architectures, for implementing embodiments of the present invention, is shown. As depicted in FIG. 5, embodiments of the present invention may be realized utilizing an open system interconnect (OSI) 510, a transmission control protocol/internet protocol (TCP/IP) 515, or the like architecture.

A given protocol architecture comprises a code stack providing for receipt, routing, flow control, and the like, of one or more data packets. An exemplary protocol utilized by embodiments of the present invention comprises the TCP/IP protocol 515. The TCP/IP protocol stack 515 comprises a network access layer 525, an internet layer 530, and a transport layer 535. The network access layer 515 provides for receipt of one or more packets. The internet layer 530 provides for routing of the one or more packets. The transport layer 535 provides for flow control of the one or more packets.

A receive thread 545 and a drainer thread 345 are utilized to implement the TCP/IP protocol stack 515. In one implementation the receive thread 545 provides for implementing the network access layer 525 and the internet layer 530. The drainer thread 550 provides for implementing the transport layer 535. In another implementation, the receive thread 545 provides for implementation of the network access layer 525. The drainer thread 550 provides for implementing the internet layer 530 and transport layer 535.

In a multi-processor network device there is an instance of a protocol stack 515 for each receive stream. Furthermore, each receive thread is associated with a network interface card. Each drainer thread is associated with a processor. The receive threads and/or the drainer threads may be pooled. The pooled receive threads and/or drainer threads may thereafter be selectively dispatched to handle receive processing of a given data packet, thereby improving system performance.

Furthermore, the performance of the network device may be increased by creating additional receive threads and/or drainer threads. The number of receive threads and/or drainer threads in a respective pool may be based upon the hardware configuration (e.g., processors, interface modules, and the like) and/or the system load (e.g., number of connections and the like). In one implementation a plurality of drainer threads are created based upon the greater of the number of processors or interface modules.

In one implementation, selective dispatching the receive and/or drainer threads may be implemented by a receive portion of a protocol stack. In another implementation, selective dispatching the receive and/or drainer threads may be implemented by a routing portion of the protocol stack. In yet another implementation, selective dispatching the receive and/or drainer threads may be implemented by a flow control portion of the protocol stack.

In one implementation, the receive and drainer threads are dispatched round robin from the pool to provide for receipt of the next data packet. Thus, receipt of a data packet may be provided by any one of the processors. In another implementation, the receive threads and/or drainer threads are selectively dispatched from the pool. Thus, receipt of a data packet may be provided by the same processor, which previously provided for receipt of a data packets from the same receive stream. As a result, connection locality may be maintained.

In addition, the receive thread 545 provides for receipt of an additional data packet, while the drainer thread 550 is processing the current packet. Thus, the network access layer 525 can advantageously process additional packets. The increased packet handling capacity of the network access layer 525 reduces the chance that data packets will be dropped during periods of high data packet traffic and/or high system load. As a result, the increased packet handling capacity increases system throughput, which offsets the data latency resulting from the multiple threads 545, 550.

Figures 6A, 6B:
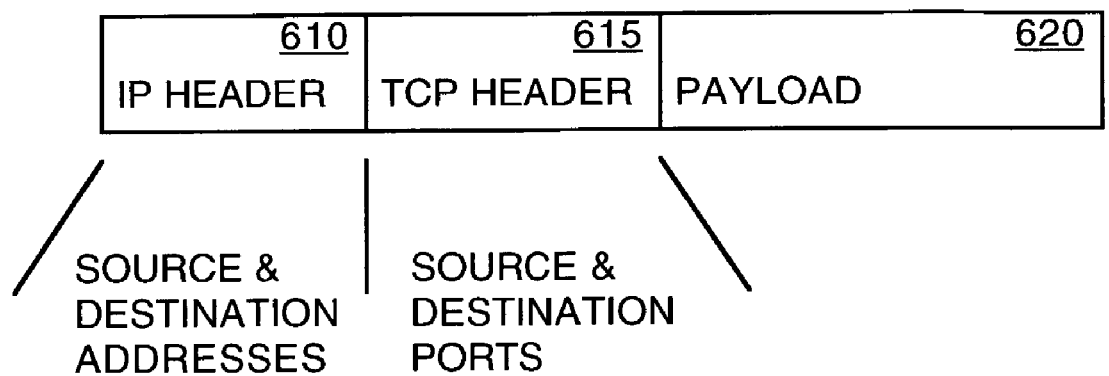
FIG. 6A shows a block diagram of an exemplary data packet for implementing embodiments of the present invention.
FIG. 6B shows a block diagram of an exemplary hash table in accordance with one embodiment of the present invention.

Referring now to FIG. 6A, a block diagram of an exemplary data packet for implementing embodiments of the present invention is shown. As depicted in FIG. 6A, the data packet comprises an internet protocol (IP) header 610, a transport control protocol (TCP) header 615, and a payload 620. The IP header 610 comprises one or more fields indicating a source address, a destination address, and the like. The TCP header 615 comprises one or more fields indicating a source port, a destination port, and the like.

In one implementation, the source address, the destination address, the source port, and/or the destination port, of the IP and TCP headers 610, 615 are applied to a hash function to calculate a unique index. The unique index is substantially smaller than the IP and TCP headers 610, 615, and therefore facilitates correlation of the header to one or more particular threads.

In one implementation, the hash function comprises a folding hash function. The folding hash function begins by adding together the strings representing the source address, destination address, source port, and/or destination port. The index is then obtained by using some arbitrary number of bits of the sum.

Referring now to FIG. 6B, a block diagram of an exemplary hash table in accordance with one embodiment of the present invention is shown. As depicted in FIG. 6B, the table comprises a plurality of records 630. Each record 630 comprises an index 635 and one or more corresponding thread identifiers 640. In one implementation, two threads 640 are created for each processor in a network device. Each thread 640 for a given processor is then assigned to a given index 635. For example, threads T0 and T1 are created to be utilized by processor X. Threads T0 and T1 are associated with an index of '0' corresponding to the hash of the particular combination of source and destination address and source and destination port. Therefore, processor X will be utilized to provide for receipt of packets from the same receive stream.

Figure 7:
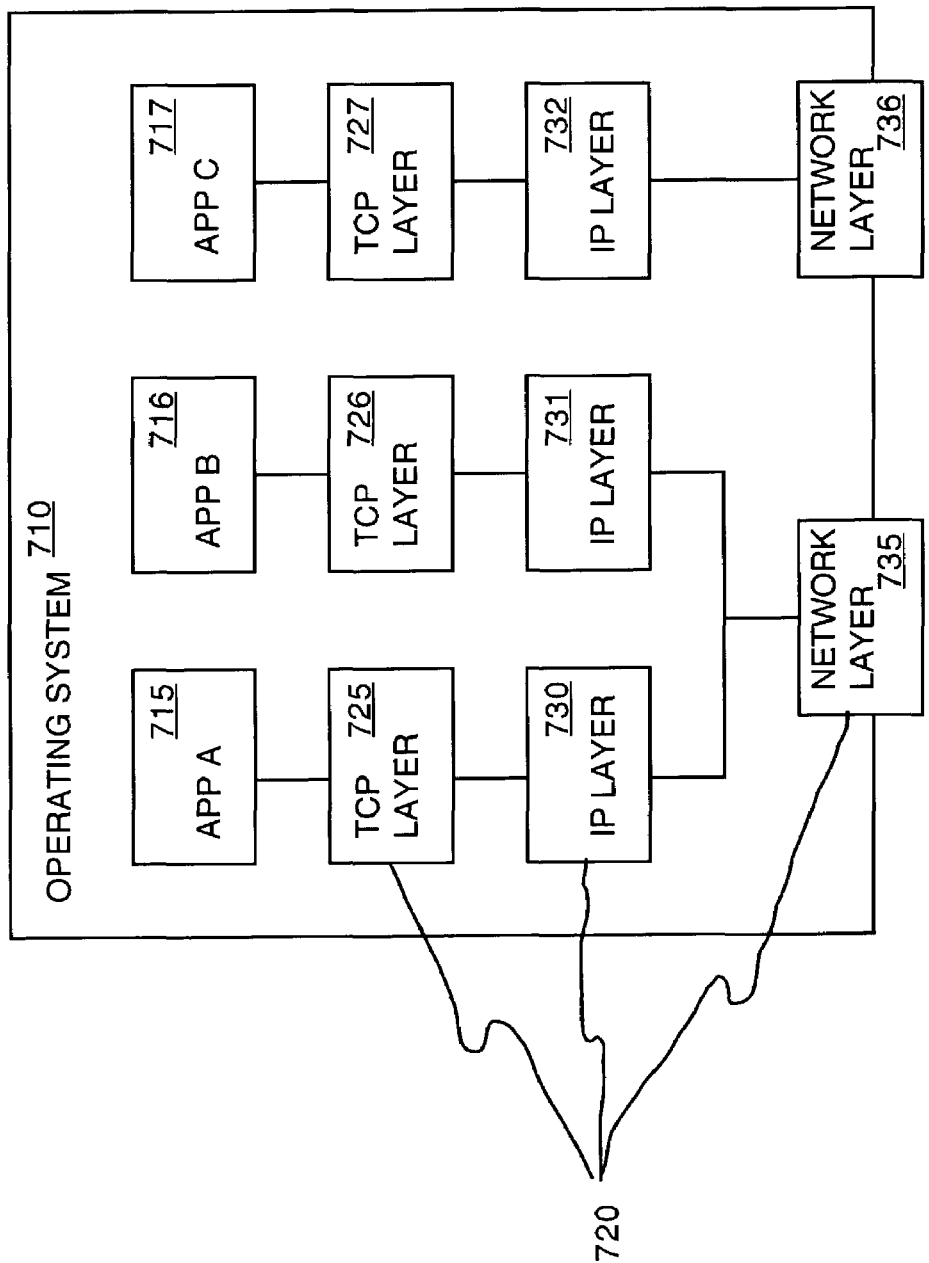
FIG. 7 shows a block diagram of an operating environment of a network device in accordance with one embodiment of the present invention.

Referring now to FIG. 7, a block diagram of an operating environment of a network device in accordance with one embodiment of the present invention is shown. As depicted in FIG. 7, the operating environment comprises an operating system 710 providing for control of the execution of one or more applications 715, 716, 717. Each application 715, 716, 717 may be receiving data from one or more communication channels. Each receive stream 720 comprises an instance of a network communication protocol.

An exemplary network communication protocol comprises a TCP layer 725, in IP layer 730 and a network layer 735. The TCP layer 725 provides for flow control of data packets. The IP layer 730 provides for addressing and routing of data packets. The network layer 735 provides an interface to the communication channel whereby packets are received therefrom.

Each instance of the network layer 735, 736 may be provided by firmware in a corresponding network interface card (NIC), and/or one or more processors operating on one or more series of instructions (e.g., code) that reside on a computer-readable medium. Each instance of the IP layer 730, 731, 732, the TCP layer 725, 726, 727, and the corresponding application 715, 716, 717 may be provided by one or more series of instructions that reside on a computer-readable medium and are executed by the one or more processors.

Incoming data packets in a give receive stream are processed by a corresponding instance of the network layer 735, 736. When a data packet is acquired an interrupt is generated. The operating system 710 catches the interrupt, thereby allocating and dispatching a thread of execution to provide the receive function of the network layer 735, 736 and the corresponding instance of the routing function of the IP layer 730, 731, 732.

In one implementation, the network layer 735, 736, prior to generation of the interrupt, applies a hash function to the header of the data packet. The hash function may be applied to the source address, destination address, source port, and/or destination port contained the IP header and/or TCP header of the data packet. The unique index is then included in the interrupt. Upon receipt of the interrupt, the operating system may then select an appropriate thread based upon the unique index. The selected thread is dispatched to provide for execution of the corresponding instance of the IP layer 730, 731, 732, and/or TCP layer 725, 726, 727.

In another implementation, the IP layer or the TCP layer applies the hash function to the header of the data packet. Thereafter, the operating system dispatches a particular thread from the pool.

Depending upon the type of network device and the data packet traffic received thereby, it may be desirable to increase or decrease the number of threads in the pool. The threads comprising the pool may range between one to three times, or more, the number of processors in the network device. In one implementation, the protocol stack defaults to creating two threads per processor or NIC, whichever is greater. A system administrator may then increase or decrease the number of threads in the pool to more efficiently utilize the processors of the network device and/or increase data packet throughput.

Embodiments of the present invention are advantageous in that the thread is selectively dispatched such that a particular instance of a network communication protocol is performed by a particular processor, which previously provided for receipt of data packets bound for the same destination and/or originating from the same source. Furthermore, selectively dispatching the thread based upon source and/or destination information contained in the header of the data packet, increases data locality. Thus, embodiments of the present invention advantageously minimize wasting cache space on transient data, which results in cache trashing. Reducing cache trashing reduces bus traffic resulting from increased reading and writing between the cache of a given processor and main memory of the network device. Thus, reducing cache trashing also results in reduced processor utilization and traffic on the bus.

Figure 8:
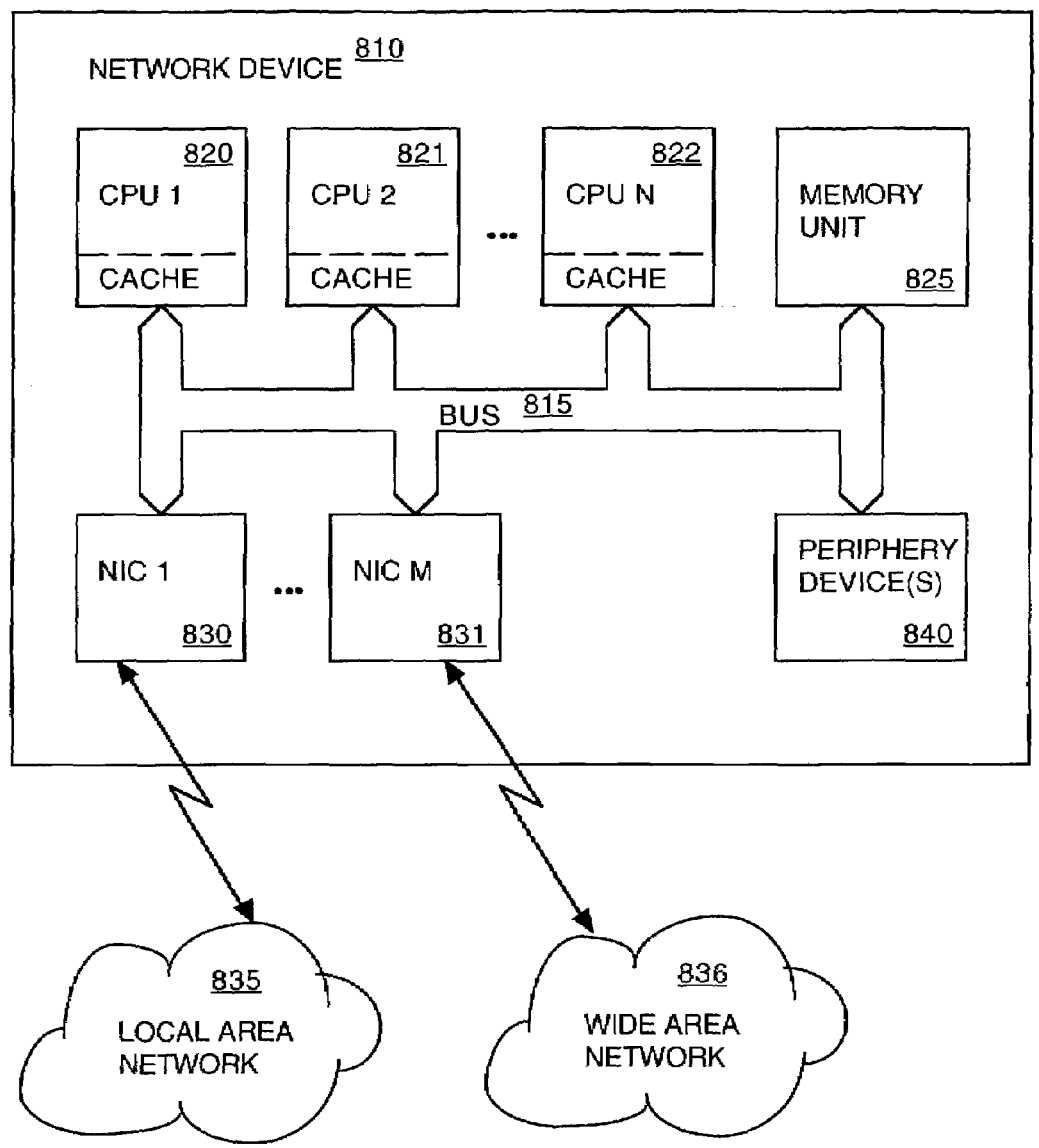
FIG. 8 a block diagram of an exemplary network device for implementing embodiments of the present invention.

Referring now to FIG. 8, a block diagram of an exemplary network device 810 for implementing embodiments of the present invention is shown. As depicted in FIG. 8, the network device 810 comprises an address/data bus 815 for communicating information and instructions. Two or more processors 820, 821, 822 are coupled with the bus 815 for processing information and instructions.

A memory unit 825 is also coupled to the bus 815 for storing information and instructions for use by the processors 820, 821, 822. The memory unit 825 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. Furthermore, each processor 820, 821, 822 has one or more levels of corresponding cache memory, which may be on chip or external. The cache is utilized to increase performance by reducing bus traffic caused by the processor repeatedly fetching information and instructions from the memory unit 825, which are regularly utilized by the corresponding processor 820, 821, 822.

The network device 810 may also include peripheral devices 840 (e.g. display, keyboard, pointing device, speaker, and the like) coupled to the bus 815. The peripheral devices 840 may be utilized to input, output, display, store and the like, information and instructions in the network device 810.

The network device 810 also includes one or more network interface cards (NICs) 830, 831 coupled to the bus 815. The NICs 830, 831 provides for communicating with other network devices across one or more communication channels 835, 836.

Certain processes and steps of the present invention are realized as a series of instructions (e.g. code) that reside on a computer-readable medium such as the memory unit 825, and are executed by the processors 820, 821, 822. When executed, the instructions cause the processors 820, 821, 822 to provide an operating system, one or more applications, one or more network communication protocols, and the like.

For each application receiving a stream of data via a NIC, there is an instance of a network communication protocol suite. In an exemplary embodiment, the network communication protocol suite comprises a transmission control protocol/internet protocol (TCP/IP). The TCP/IP protocol comprises a transmission control protocol (TCP) layer, an internet protocol (IP) layer, and a data link protocol interface (DLPI) layer. The TCP layer provides for flow control of data packets. For each instance of the TCP layer, there is an instance of an IP layer. The IP layer provides for addressing and routing of data packets. For one or more instances of IP layer, there is also an instance of a DLPI layer.

Each instance of the DLPI layer may be provided by firmware in a corresponding NIC 830, 831, and/or one or more of the processors 820 operating on instructions and information contained in the memory unit 825. Each instance of the DLPI layer provides for receipt of data packets from a respective communication channel 835, 836.

Incoming data packets are buffered by the NIC 830, 831, for receive processing by a corresponding instance of the DLPI layer. When an incoming data packet is buffered by one of the NICs 830, 831 an interrupt is generated. In an exemplary embodiment, the operating system catches the interrupt, thereby allocating and dispatching a receive thread of execution to provide the receive function of the DLPI layer and the routing function of the IP layer.

In one implementation, the DLPI layer applies a hash function to the source address, destination address, source port, and/or destination port of the IP header and/or TCP header of the data packet. The hash function provides a unique index, which is utilized to select an appropriate drainer thread. Thereafter, the operating system selects and dispatches a drainer thread of execution to provide the flow control function of the TCP layer.

Embodiment of the present invention provide for improved load balancing in a multi-processor network device. Embodiments of the present invention are also advantageous in that a particular instance of a network communication protocol is performed by a particular processor, which previously provided for receipt of data packets bound for the same destination and/or originating from the same source. Thus, embodiments of the present invention advantageously reduce processor utilization. Embodiments of the present invention also increase throughput of the network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A network device comprising:
   an interface module communicatively coupled to a network for acquiring a data packet over the network;
   a pool of a plurality of threads of execution for processing said data packet; and
   a dynamic pool allocator for selectively dispatching one of the plurality of threads of execution from said pool, wherein said dynamic pool allocator hashes a header of said data packet to determine a hash index, which is utilized by said dynamic pool allocator to select said one of the plurality of threads of execution from said pool, said dynamic pool allocator dispatching an available thread of execution from said pool, when said hash index does not have a corresponding thread from said pool in a hash table of said dynamic pool allocator, said hash table correlating one of a plurality of hash indexes to one or more threads of said pool of threads, adding another record to said hash table, and said added record comprising said hash index and said allocated thread of execution.

2. The network device according to claim 1, wherein said plurality of threads of execution comprise a single thread of execution for processing said data packet.

3. The network device according to claim 2, wherein said single thread of execution comprises an instance of a transport control protocol/internet protocol (TCP/IP) suite.

4. The network device according to claim 1, wherein said plurality of threads of execution comprise a receive thread and a drainer thread for processing said data packet.

5. The network device according to claim 4, wherein said receive thread and corresponding said drainer thread comprise an instance of a transport control protocol/internet protocol (TCP/IP) suite.

6. The network device according to claim 1, wherein said dynamic pool allocator comprises a hash function for determining said hash index as a function of said header of said data packet.

7. A network communication receive process comprising:
acquiring a data packet over a network;
selectively dispatching a thread of execution from a pool of threads by hashing a header of said data packet to determine a hash index by a dynamic pool allocator, wherein the hash index is utilized by said dynamic pool allocator to select said thread of execution, said dynamic pool allocator dispatching an available thread of execution from said pool, when said hash index does not have a corresponding thread from said pool in a hash table of said dynamic pool allocator, said hash table correlating one of a plurality of hash indexes to one or more threads of the pool of threads, adding another record to said hash table, and said added record comprising said hash index and said allocated thread of execution;
processing said header of said data packet utilizing said thread of execution; and
delivering a payload of said data packet to a destination application according to said processing said header.

8. The network communication receive process according to claim 7, further comprising:
determining the number of resource components in said network; and
forming said pool of threads, wherein the number of threads in said pool is a function of the number of said resource components.

9. The network communication receive process according to claim 8, wherein said resource components comprise a processor.

10. The network communication receive process according to claim 8, wherein said resource components comprise a network module.

11. The network communication receive process according to claim 7, wherein said selectively dispatching said thread of execution from said pool of threads comprises selecting said thread of execution according said hash index which is determined by a hash function of said header.

12. The network communication receive process according to claim 11, wherein said hash function uniquely associates said header having one or more fields containing one or more particular values with a particular thread of execution from said pool of threads.

13. The network communication receive process according to claim 12, wherein said one or more fields are selected from the group consisting of source address field, destination address field, source port field and destination port field.

14. The network communication receive process according to claim 7, wherein said selectively dispatching a thread of execution further comprises:
dynamically allocating a single thread of execution when a first state of a network device exists; and
dynamically allocating a receive thread and a drainer thread when a second state of said network device exists.

15. The network communication receive process according to claim 14, wherein said selectively dispatching a thread of execution further comprises determining said first state and said second state from one or more conditions consisting of a system load, a trend of said system load, a traffic type, and a trend of said traffic type.

16. A method of providing for execution of a protocol in a network comprising:
applying a hash function to one or more fields in a header of a data packet, wherein a hash index is determined;
querying a hash table, wherein each of a plurality of records in the hash table correlates one of a plurality of hash indexes to one or more of a plurality of threads of execution;
selecting an available thread of execution from said one or more of said plurality of threads of execution corresponding to said hash index;
dispatching said available thread of execution;
allocating an available thread of execution from said plurality of threads of execution to dispatch, when said hash index does not have a corresponding thread of said plurality of threads of execution in said hash table; and
adding another record to said hash table, wherein said record comprises said hash index and said allocated thread of execution.

17. The method according to claim 16, further comprising: establishing a number of said plurality of threads according to the number of processors in a network device.

18. The method according to claim 16, further comprising:
establishing a number of said plurality of threads according to the number of network modules in a network device.

19. The method according to claim 16, further comprising:
establishing a number of said plurality of threads according to the greater of a quantity of processors or network modules in a network device.

* * * * *